(12) United States Patent
Radlinski et al.

(10) Patent No.: US 8,825,641 B2
(45) Date of Patent: Sep. 2, 2014

(54) MEASURING DUPLICATION IN SEARCH RESULTS

(75) Inventors: Filip Radlinski, Vancouver (CA); Paul Nathan Bennett, Kirkland, WA (US); Emine Yilmaz, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 39 days.

(21) Appl. No.: 12/942,553

(22) Filed: Nov. 9, 2010

(65) Prior Publication Data

US 2012/0117043 A1    May 10, 2012

(51) Int. Cl.
*G06F 17/30* (2006.01)

(52) U.S. Cl.
USPC .......... 707/727; 707/664; 707/706; 707/722; 707/741; 707/750

(58) Field of Classification Search
None
See application file for complete search history.

(56) References Cited

U.S. PATENT DOCUMENTS

| | | | |
|---|---|---|---|
| 7,165,069 B1 * | 1/2007 | Kahle et al. | 1/1 |
| 7,603,370 B2 | 10/2009 | Manasse | |
| 7,680,785 B2 | 3/2010 | Najork | |
| 7,689,647 B2 | 3/2010 | Joy et al. | |
| 7,779,002 B1 * | 8/2010 | Gomes et al. | 707/728 |
| 7,836,009 B2 * | 11/2010 | Paczkowski et al. | 1/1 |
| 8,255,413 B2 * | 8/2012 | Bennett et al. | 707/766 |
| 2006/0041597 A1 | 2/2006 | Conrad et al. | |
| 2006/0248066 A1 * | 11/2006 | Brewer | 707/4 |
| 2008/0044016 A1 | 2/2008 | Henzinger | |
| 2009/0171986 A1 * | 7/2009 | Chitrapura et al. | 707/100 |
| 2010/0150453 A1 | 6/2010 | Ravid et al. | |
| 2010/0169343 A1 * | 7/2010 | Kenedy et al. | 707/758 |

OTHER PUBLICATIONS

Jansen, "Investigating Customer Click Through Behavior with Integrated and Nonsponsored Results," Int. J. Internet Marketing and Advertising, retrieved from http://faculty.ist.psu.edu/jjansen/academic/jansen_click_through_sponsored_links.pdf, vol. 5, Nos. 1/2, 2009, Copyright 2009, pp. 74-94, Inderscience Enterprises Ltd.*
Agrawal, et al., "Diversifying Search Results", retrieved on Aug. 23, 2010 at <<http://research.microsoft.com/pubs/73931/diversifying-wsdm09.pdf>>, ACM, Proceedings of Intl Conference on Web Search and Data Mining (WSDM), Barcelona, Spain, 2009, pp. 1-10.

(Continued)

*Primary Examiner* — Kaveh Abrishamkar
*Assistant Examiner* — James J Wilcox
(74) *Attorney, Agent, or Firm* — Pablo Tapia; Jim Ross; Micky Minhas

(57) ABSTRACT

Measuring duplication in search results is described. In one example, duplication between a pair of results provided by an information retrieval system in response to a query is measured. History data for the information retrieval system is accessed and query data retrieved, which describes the number of times that users have previously selected either or both of the pair of results, and a relative presentation sequence of the pair of results when displayed at each selection. From the query data, a fraction of user selections is determined in which a predefined combination of one or both of the pair of results were selected for a predefined presentation sequence. From the fraction, a measure of duplication between the pair of results is found. In further examples, the information retrieval system uses the measure of duplication to determine an overall redundancy value for a result set, and controls the result display accordingly.

20 Claims, 6 Drawing Sheets

(56) References Cited

OTHER PUBLICATIONS

Agrawal, et al., "Generating Labels from Clicks", retrieved on Aug. 23, 2010 at <<http://wsdm2009.org/papers/p172-agrawal.pdf>>, ACM, Proceedings of Intl Conference on Web Search and Data Mining (WSDM), Barcelona, Spain, 2009, pp. 1-10.

Broder, "A Taxonomy of Web Search", retrieved on Aug. 23, 2010 at <<http://www.sigir.org/forum/F2002/broder.pdf>>, ACM, SiIGIR Forum, vol. 36, No. 2, Fall 2002, pp. 1-8.

Broder, "Identifying and Filtering Near-Duplicate Documents", retrieved on Aug. 23, 2010 at <<http://www.cs.brown.edu/courses/cs253/papers/nearduplicate.pdf>>, Springer-Verlag Berlin, Combinatorial Pattern Matching (CPM), Lecture Notes in Computer Science 1848, 2000, pp. 1-10.

Broder, et al., "Syntactic Clustering of the Web", retrieved on Aug. 23, 2010 at <<http://www.hpl.hp.com/techreports/Compaq-DEC/SRC-TN-1997-015.pdf>>, Digital Equipment Corporation, SRC Technical Note 1997-015, 1997, pp. 1-13.

Carbonell, et al., "The Use of MMR, Diversity-Based Reranking for Reordering Documents and Producing Summaries", retrieved on Aug. 23, 2010 at <<http://www.cs.cmu.edu/~jgc/publication/The_Use_MMR_Diversity_Based_LTMIR_1998.pdf>>, ACM, Proceedings of Intl Conference on Research and Development in Information Retrieval (SIGIR), Melbourne, Australia, 1998, pp. 335-336.

Carterette, et al., "Evaluating Search Engines by Modeling the Relationship Between Relevance and Clicks", retrieved on Aug. 23, 2010 at <<http://ciir.cs.umass.edu/~carteret/nips07.pdf>>, Proceedings of the Advances in Neural Information Processing Systems (NIPS), 2007, pp. 1-8.

Carterette, et al., "Here or There: Preference Judgments for Relevance", retrieved on Aug. 23, 2010 at <<http://citeseerx.ist.psu.edu/viewdoc/download?doi=10.1.1.146.4098&rep=rep1&type=pdf>>, Proceedings of European Conference on Information Retrieval (ECIR), 2008, pp. 1-12.

Charikar, "Similarity Estimation Techniques from Rounding Algorithms", retrieved on Aug. 23, 2010 at <<http://citeseerx.ist.psu.edu/viewdoc/download?doi=10.1.1.147.4064&rep=rep1&type=pdf>>, ACM, Proceedings of Symposium on Theory of Computing (STOC), Montreal, Canada, May 2002, pp. 1-9.

Chen, et al., "Less is More: Probabilistic Models for Retrieving Fewer Relevant Documents", retrieved on Aug. 23, 2010 at <<http://people.csail.mit.edu/harr/papers/sigir2006.pdf>>, ACM, Proceedings of Intl Conference on Research and Development in Information Retrieval (SIGIR), Seattle, Washington, Aug. 2006, pp. 1-8.

Chowdhury, et al., "Collection Statistics for Fast Duplicate Document Detection", retrieved on Aug. 23, 2010 at <<http://citeseerx.ist.psu.edu/viewdoc/download?doi=10.1.1.5.3673&rep=rep1&type=pdf>>, ACM Transactions on Information Systems, vol. 20, No. 2, Apr. 2002, pp. 171-191.

Clarke, et al., "An Effectiveness Measure for Ambiguous and Underspecified Queries", Springer-Verlag Berlin, Proceedings of Intl Conference on Theory of Information Retrieval: Advances in Information Retrieval Theory (ICTIR), 2009, pp. 188-199.

Classification and Regression Trees, retrieved on Aug. 23, 2010 at <<http://www.stat.cmu.edu/~cshalizi/350/lectures/22/lecture-22.pdf>>, Carnegie Mellon University, Department of Statistics: Data Mining Lecture 22, Nov. 2009, pp. 1-25.

Craswell, et al., "An Experimental Comparison of Click Position-Bias Models", retrieved on Aug. 23, 2010 at <<http://www.wsdm2009.org/wsdm2008.org/WSDM2008-papers/p87.pdf>>, ACM, Proceedings of Intl Conference on Web Search and Data Mining (WSDM), Palo Alto, California, Feb. 2008, pp. 87-94.

Domingos, "MetaCost: A General Method for Making Classifiers Cost-Sensitive", retrieved on Aug. 23, 2010 at <<http://citeseerx.ist.psu.edu/viewdoc/download?doi=10.1.1.15.7095&rep=rep1&type=pdf>>, ACM, Proceedings of Intl Conference on Knowledge Discovery and Data Mining (KDD), 1999, pp. 1-10.

Fox, et al., "Evaluating Implicit Measures to Improve Web Search", retrieved on Aug. 23, 2010 at <<http://citeseerx.ist.psu.edu/viewdoc/download?doi=10.1.1.132.5847&rep=rep1&type=pdf>>, ACM Transactions on Information Systems, vol. 23, No. 2, Apr. 2005, pp. 147-168.

Gollapudi, et al., "An Axiomatic Approach to Result Diversification", retrieved on Aug. 23, 2010 at <<http://www2009.org/proceedings/pdf/p381.pdf>>, ACM, Intl Conference on the World Wide Web (WWW), Madrid, Spain, Apr. 2009, pp. 381-390.

Granka, et al., "Eye-Tracking Analysis of User Behavior in WWW Search", retrieved on Aug. 23, 2010 at <<http://www.cs.cornell.edu/People/tj/publications/granka_etal_04a.pdf>>, ACM Proceedings of Intl Conference on Research and Development in Information Retrieval (SIGIR), Sheffield, UK, Jul. 2004, pp. 1-3.

Hajishirzi, et al., "Adaptive Near-Duplicate Detection via Similarity Learning", retrieved on Aug. 23, 2010 at <<http://research.microsoft.com/pubs/130851/ANDD.pdf>>, ACM Proceedings of Intl Conference on Research and Development in Information Retrieval (SIGIR), Geneva, Switzerland, Jul. 2010, pp. 419-426.

Hall, et al., "The WEKA Data Mining Software: An Update", retrieved on Aug. 23, 2010 at <<http://www.sigkdd.org/explorations/issues/11-1-2009-07/p2V11n1.pdf>>, ACM SIGKDD Explorations Newsletter, vol. 11, No. 1, Jun. 2009, pp. 1-9.

Henzinger, "Finding Near-Duplicate Web Pages: A Large-Scale Evaluation of Algorithms", retrieved on Aug. 23, 2010 at <<http://blogimg.chinaunix.net/blog/upfile2/071216125758.pdf>>, ACM, Proceedings of Intl Conference on Research and Development in Information Retrieval (SIGIR), Seattle, Washington, Aug. 2006, pp. 284-291.

Joachims, et al., "Evaluating the Accuracy of Implicit Feedback from Clicks and Query Reformulations in Web Search", retrieved on Aug. 23, 2010 at <<http://citeseerx.ist.psu.edu/viewdoc/download?doi=10.1.1.147.532&rep=rep1&type=pdf>>, ACM Transactions on Information Systems, vol. 25, No. 2, Article 7, Apr. 2007, pp. 1-26.

Joachims, "Optimizing Search Engines using Clickthrough Data", retrieved on Aug. 23, 2010 at <<http://www.cs.cornell.edu/People/tj/publications/joachims_02c.pdf>>, ACM, Proceedings of Intl Conference on Knowledge Discovery and Data Mining (SIGKDD), Edmonton, Canada, 2002, pp. 1-10.

Manku, et al., "Detecting Near-Duplicates for Web Crawling", retrieved on Aug. 23, 2010 at <<http://citeseerx.ist.psu.edu/viewdoc/download?doi=10.1.1.78.7794&rep=rep1&type=pdf>>, ACM, Intl Conference on the World Wide Web (WWW), Banff, Canada, May 2007, pp. 141-149.

Manning, et al., "An Introduction to Information Retrieval", retrieved on Aug. 23, 2010 at <<http://nlp.stanford.edu/IR-book/pdf/irbookonlinereading.pdf>>, Cambridge University Press, Apr. 2009, pp. 1-581.

Rabin, "Fingerprinting by Random Polynomials", Harvard University, Technical Report TR-1581, 1981, pp. 1-14.

Radlinski, et al., "Active Exploration for Learning Rankings from Clickthrough Data", retrieved on Aug. 23, 2010 at <<http://radlinski.org/papers/Radlinski07ActiveRanking.pdf>>, ACM, Proceedings of Intl Conference on Knowledge Discovery and Data Mining (KDD), Aug. 2007, pp. 1-10.

Radlinski, et al., "Minimally Invasive Randomization for Collecting Unbiased Preferences from Clickthrough Logs", retrieved on Aug. 23, 2010 at <<http://www.aaai.org/Papers/AAAI/2006/AAAI06-221.pdf>>, American Association for Artificial Intelligence, 2006, pp. 1406-1412.

Radlinski, et al., "Redundancy, Diversity and Interdependent Document Relevance", retrieved on Aug. 23, 2010 at <<http://ir.cis.udel.edu/IDR-workshop/idr-workshop-2009.pdf>>, ACM, SIGIR Forum Workshop Report, vol. 43, No. 2, Dec. 2009, pp. 1-7.

Theobald, et al., "SpotSigs: Robust and Efficient Near Duplicate Detection in Large Web Collections", ACM, Proceedings of Intl Conference on Research and Development in Information Retrieval (SIGIR), Singapore, 2008, pp. 563-570.

Wang, et al., "Portfolio Theory of Information Retrieval", retrieved on Aug. 23, 2010 at <<http://citeseerx.ist.psu.edu/viewdoc/download?oi=10.1.1.156.2242&rep=rep1&type=pdf>>, ACM Proceedings of Intl Conference on Research and Development in Information Retrieval (SIGIR), Boston, Massachusetts, 2009, pp. 1-8.

Yue, et al., "Predicting Diverse Subsets Using Structural SVMs", retrieved on Aug. 23, 2010 at <<http://www.cs.cornell.edu/people/tj/

(56) References Cited

OTHER PUBLICATIONS publications/yue_joachims_08a.pdf>>, Proceedings of the Intl Conference on Machine Learning (ICML), Helsinki, Finland, 2008, pp. 1-8.

Zhai, et al., "Beyond Independent Relevance: Methods and Evaluation Metrics for Subtopic Retrieval", retrieved on Aug. 23, 2010 at <<http://www.cs.cmu.edu/~wcohen/postscript/sigir-2003.pdf>>, ACM, Proceedings of Intl Conference on Research and Development in Information Retrieval (SIGIR), Toronto, Canada, 2003, pp. 1-8.

Zhu, et al., "Improving Diversity in Ranking using Absorbing Random Walks", retrieved on Aug. 23, 2010 at <<http://pages.cs.wisc.edu/~jerryzhu/pub/grasshopper.pdf>>, Association for Computational Linguistics, Proceedings of Conference on Human Language Technology (HLT-NAACL), Rochester, New York, Apr. 2007, pp. 97-104.

* cited by examiner

MEASURING DUPLICATION IN SEARCH RESULTS

BACKGROUND

Information retrieval systems are widely used by users to search for information on a given subject. Web search systems are an example of one type of information retrieval system. Users submit a query to the web search system and obtain a list of results comprising links to documents that are relevant to the entered query.

However, the web contains many duplicate and near-duplicate documents. Given that user satisfaction is negatively affected by redundant information in search results, a significant amount of research has been devoted to developing duplicate detection algorithms. However, most such algorithms rely solely on document content to detect duplication/redundancy, ignoring the fact that a primary goal of duplicate detection is to identify documents that contain redundant information with respect to a given user query.

Previous techniques for identifying duplicates are based on identifying similarities between document contents. Since discovering all possible duplicate documents in a document set of size N uses $O(N^2)$ comparisons, efficiency as well as accuracy are two main concerns of existing algorithms. The simplest approach for detecting exact duplicates is based on a fingerprint that is a succinct digest of the characters in a document. When the fingerprints of two documents are identical, the documents are further compared, and identical documents are identified as duplicates. This technique does not identify near duplicates: web pages that are not identical but still very similar in content. Previous algorithms for identifying near duplicates are based on generating n-gram vectors from documents and computing a similarity score between these vectors based on a certain similarity metric. If the similarity between two documents is above a threshold, the two documents are considered to be near duplicates of each other.

All these techniques for duplicate detection are based on using the contents of the documents. Methods that solely depend on similarities in terms of document contents do not identify documents that contain similar information with respect to a user need. That is, in most cases, duplicate detection is aimed at identifying documents that are of the same utility to an end user. However, when only document contents are used for duplicate detection, utility is ignored. Two documents can be of the same utility (containing duplicate information) even if the contents are different. For example, two newspaper articles describing exactly the same event but with different words are often duplicates of each other, and hence users who have read one of these may not be interested in reading the other one. Furthermore, two documents can be of different utility to an end user even if their contents are very similar. For example, two different documents containing a biography of Britney Spears, identically written except that one contains the birthday of Britney Spears while the other does not are not duplicates of each other when the goal of the user is to find out Britney Spears' age.

The embodiments described below are not limited to implementations which solve any or all of the disadvantages of known information retrieval systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Measuring duplication in search results is described. In one example, duplication between a pair of results provided by an information retrieval system in response to a query is measured. History data for the information retrieval system is accessed and query data retrieved, which describes the number of times that users have previously selected either or both of the pair of results, and a relative presentation sequence of the pair of results when displayed at each selection. From the query data, a fraction of user selections is determined in which a predefined combination of one or both of the pair of results were selected for a predefined presentation sequence. From the fraction, a measure of duplication between the pair of results is found. In further examples, the information retrieval system uses the measure of duplication to determine an overall redundancy value for a result set, and controls the result display accordingly.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
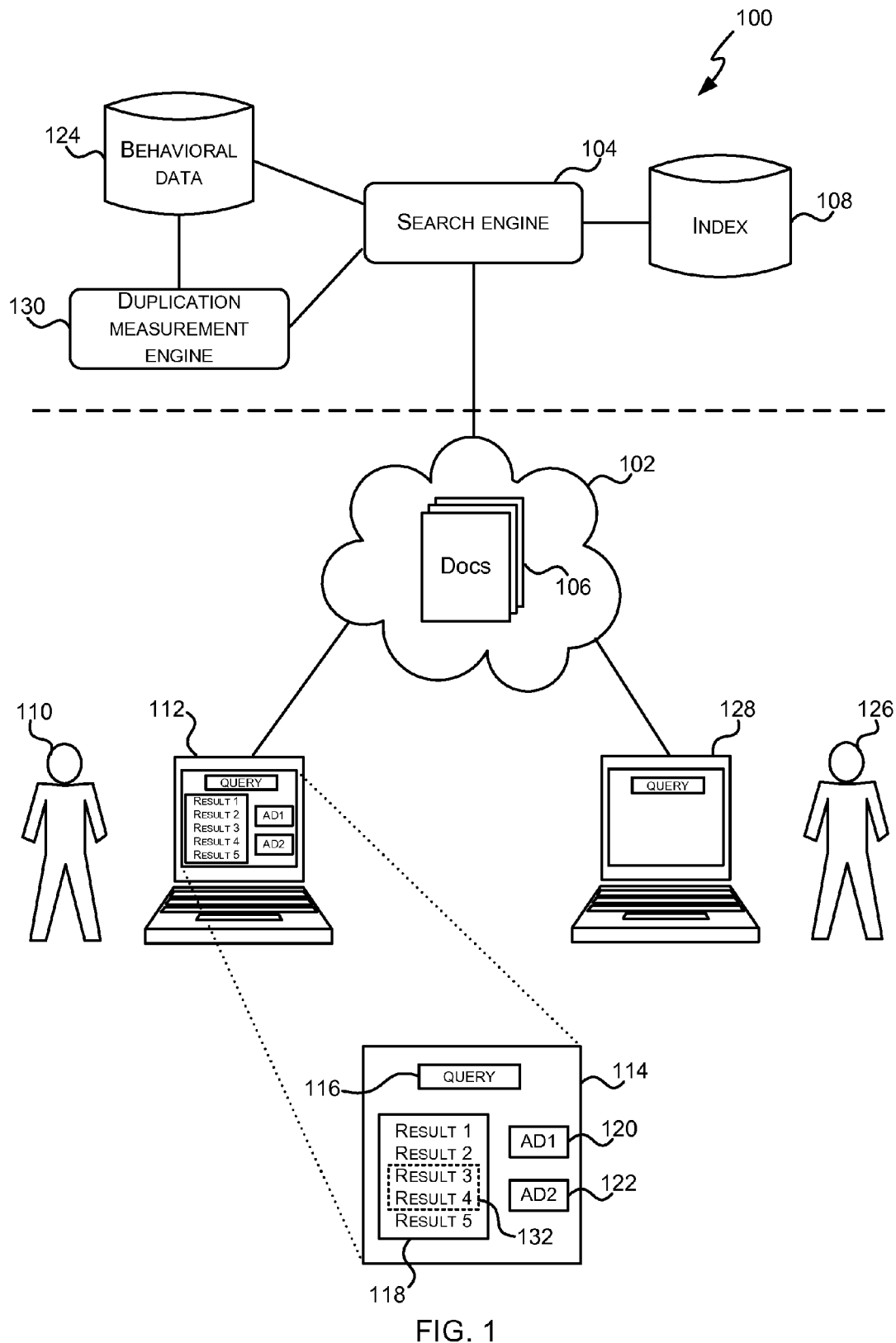
FIG. 1 illustrates an example information retrieval system.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a web search system, the system described is provided as an example and not a limitation. As those skilled in the art will appreciate, the present examples are suitable for application in a variety of different types of information retrieval systems.

User behavior and click data contains much information about the utility of documents. The term "click data" is used herein to refer to data on whether a user selected ("clicked") to view an item in a list of search results.

The term "document" is used herein to refer to any item of information which may be retrieved using a query server or search engine. A non-exhaustive list of examples includes: photographs, digital images, files, email messages, voice mail messages, short message service messages, text-based posts at a social networking service, web pages, part of a web page, maps, electronic ink, commercial products, videos, multimedia files, songs, albums, news articles, database records or a part or summary of one or more of these items.

Consider two documents d1 and d2. If these documents are duplicates or near-duplicates of each other (i.e. the documents comprise significant amounts of redundant information), then it is observed from user behavior that document d1 is not clicked very often when, for example, it is displayed below document d2 in a list of search results, and vice versa. Described herein are techniques by which behavioral data such as this can be used for the purpose of duplicate detection, and to identify documents containing the same information with respect to a query.

The techniques described herein apply to any use of aggregating implicit or explicit behavioral data typically associated with relevance across different order presentations to form a signal for redundancy. For example (as described throughout), a measurement can be made, aggregated across users, of the tendency to click on the first item versus the second as an indicator of redundancy in conditions where the results are presented in both orders. However, in alternative examples, a similar technique can measure the aggregate dwell time (time spent on a result after viewing) on the first versus the second result, again where the results are presented in both orders. The behavioral data can also be explicit behavioral data where an explicit judgment of relevance or novelty is elicited from users in a system that can alter the presentation order across users. Such explicit judgments can include, for example: binary relevance judgments, graded relevance judgments, or information nugget judgments (a judgment of whether a result contains a fine-grained "nugget" of information that covers one aspect of the query) among others.

Reference is first made to FIG. 1, which illustrates an example information retrieval system 100 which is accessed using a communications network 102. In an example, the information retrieval system 100 comprises a search engine 104 which is arranged to retrieve a ranked list of documents 106 which can be stored at, or are accessible via, the communications network 102. The search engine 104 is arranged to access an index 108 or other database in order to form the ranked list.

In the example described herein, the communications network 102 is the Internet, and the documents 106 are web pages. In other examples, the communications network 102 can be any appropriate network. A non exhaustive list of examples of appropriate networks includes: Local Area Networks (LAN), Wide Area Networks (WAN), Public Switched Telephone Networks (PSTN), and Virtual Private Networks (VPN). The communications network 102 can be a wireless network or a wired network or combinations thereof In the examples described herein the search engine 104 is a web search engine. However, in other examples the search engine 104 may be a desktop search engine, media search engine or other appropriate search engine.

Using the communications network 102 a user 110 is able to access the search engine 104, for example, using a web browser or other suitable access interface executed on a computing device 112. The search engine 104 is of any suitable type arranged to rank documents using the index 108 on the basis of the relevance of those documents to search terms input by the user 110. Those user input search terms are referred to as a query. For example, the search engine 104 is arranged to analyze user search terms and generate a rank or weighting for documents 106 on the basis of user input search terms. The search engine 104 may then provide an ordered list of the documents (or links to the documents) based on the ranking.

In an example, the user 110 using the computing device 112 can use a graphical user interface 114 (GUI) to submit a query 116 to the information retrieval system 100 in order to find relevant search results. Responsive to this, the information retrieval system 100 provides a ranked list 118 of search results, which is displayed in the user interface 114. Optionally, the information retrieval system 100 may also provide one or more relevant advertisements, such as AD1 120 and AD2 122 shown the user interface 114.

The user 110 viewing the ranked list 118 in the user interface 114 can select a result from the ranked list 118, and can view the document associated with that result. The result can be selected by the user by, for example, the user 110 using a pointing device (such as a mouse or track-pad) to actively "click" a link for that document in the result. In other examples, instead of active "clicks", selection may result from a user moving a mouse, a finger, their gaze, or other user interface device over a link to that document for at least a specified time, or performing another specified action.

When a result is selected by the user 110, the selection is recorded by the search engine 104 in a behavioral data store 124. The behavioral data store 124 stores data relating to the selection, including the query and the location of the clicked result in the ranked list. Therefore, in this example, the behavioral data store 124 stores click history data (although, in other examples, different types of behavioral data can be stored, as outlined above). More detail on the behavioral data stored is provided below with reference to FIG. 2. In some examples, a result can be recorded in the behavioral data store 124 as being selected, or clicked, only if the user did not click on any other result or issue another query within a predetermined time period (e.g. 30 seconds).

In the example of FIG. 1, a further user 126 operating a further computing device 128 can also access the information retrieval system 100 via the communication network 102. Note that many more users can also access the information retrieval system 100, but are not illustrated in FIG. 1. The information retrieval system may be accessed by a plurality of users either concurrently or at different times using any appropriate device. The computing devices 112, 128 can comprise any appropriate computer-based device. A non-exhaustive list of suitable devices includes: a desktop computer, a laptop computer, a tablet, a PDA, a telephone device, a hand-held gaming device.

The information retrieval system 100 further comprises a duplication measurement engine 130. The duplication measurement engine 130 is arranged to receive data regarding a pair of results from the search engine 104, and use the click history (in this example) from the behavioral data store 124 to determine a measure of how much duplication (or redundancy) exists between the documents referenced in the two results. For example, duplication measurement engine 130 can determine a measure of the redundancy that exists between pair of results 132 in FIG. 1, which correspond to results 3 and 4 in the ranked list 118.

By using the behavioral data, potentially in combination with other relevant data sources, a measure of redundancy can be obtained without the use of complex document content analysis. This saves significant computational resources. In addition, the use of behavioral data ensures that the utility to the user is considered, rather than a direct comparison of the contents of the documents. Techniques for determining the duplication/redundancy from the click history behavioral data are outlined below with reference to FIGS. 2 to 5.

Note that, in other examples, the duplication measurement engine 130 can be outside of the information retrieval system 100 (e.g. operated by a third party), and is provided with the requisite information by the information retrieval system 100 when a measurement of redundancy is desired.

Figure 2:
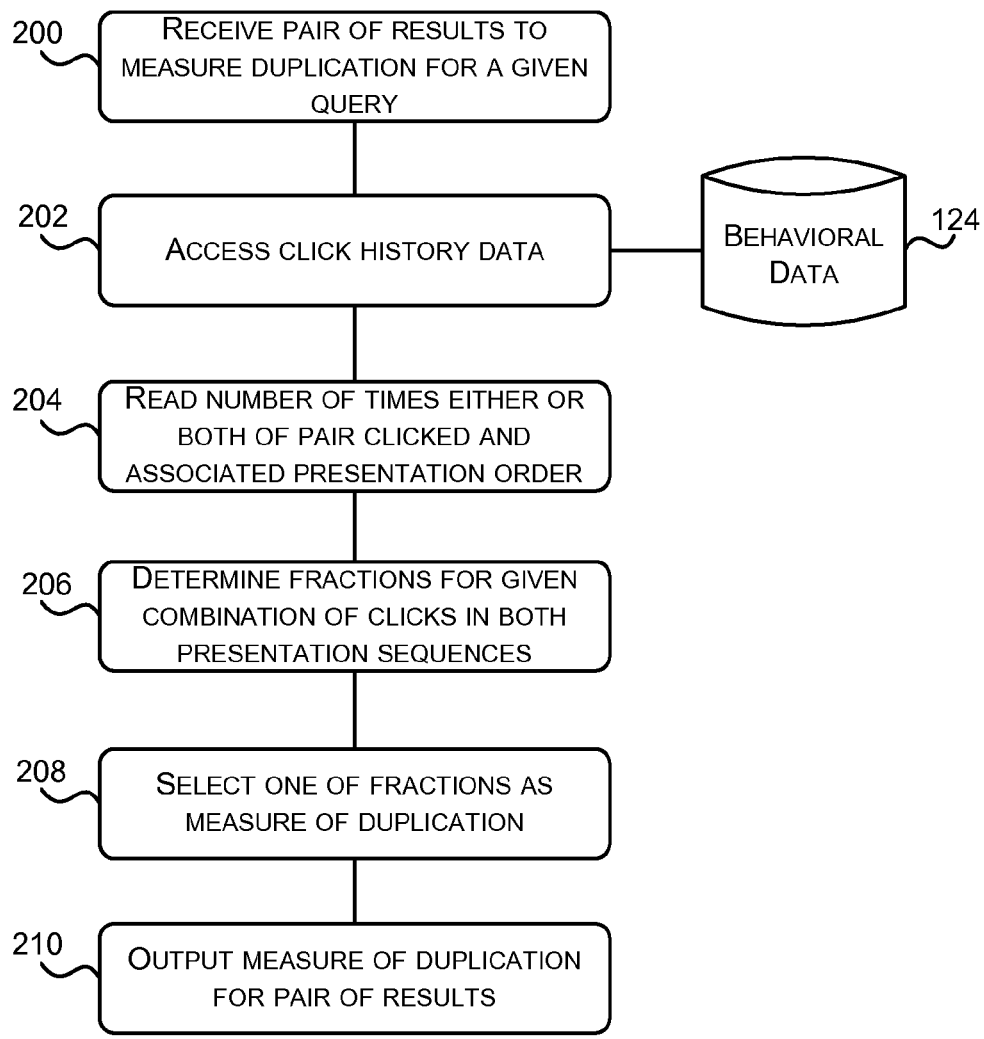
FIG. 2 illustrates a flowchart of a process for calculating duplication between a pair of search results for a given query.

Reference is now made to FIG. 2, which illustrates a flowchart of a process for calculating duplication/redundancy between a pair of search results for a given query (such as pair of results 132 and query 116 in FIG. 1). The process of FIG. 2 can be performed by the duplication measurement engine 130 of FIG. 1.

Firstly, a pair of results that were obtained for a given query is received 200. In one example, these two results are adjacent in the ranked list that was generated by the search engine 104 in response to the query. The behavioral data store 124 is then accessed 202, and query data is read 204. The query data comprises click history data that is relevant to this query. The query data can describe the number of times that users of the information retrieval system have previously selected either or both of the pair of results, and a relative presentation sequence of the pair of results when displayed in the user interface at each selection. In other words, the query data retrieved describes the frequency of selection of one or both of the pair of results, and which result was located ahead of (e.g. above or before) the other in each case.

In one example, in the case of a pair of results having a first result denoted u and a second result denoted v, the query data retrieved for a query q comprises the following:

A count of the number of times that u was selected, when u was presented ahead of v in the ranked list for the query, denoted $c^{\hat{u}v}(q)$;

A count of the number of times that v was selected, when u was presented ahead of v in the ranked list for the query, denoted $c^{u\hat{v}}(q)$;

A count of the number of times that both u and v were selected, when u was presented ahead of v in the ranked list for the query, denoted $c^{\hat{u}\hat{v}}(q)$;

A count of the number of times that v was selected, when v was presented ahead of u in the ranked list for the query, denoted $c^{\hat{v}u}(q)$;

A count of the number of times that u was selected, when v was presented ahead of u in the ranked list for the query, denoted $c^{v\hat{u}}(q)$; and A count of the number of times that both u and v were selected, when v was presented ahead of u in the ranked list for the query, denoted $c^{\hat{v}\hat{u}}(q)$.

The query data is then used to determine 206 fractions of the total number of selections (clicks) that were performed by the users in a predefined combination, for a predefined presentation sequence. In other words, the fraction of clicks that occurred due to the selection of a certain combination of one or both results (i.e. u only, v only or both u and v) when in a certain presentation sequence (i.e. u above v or vice versa) is found. For example, the fraction of times when u was selected when above v is given by:

$$\frac{c^{\hat{u}v}(q)}{c^{\hat{u}v}(q) + c^{u\hat{v}}(q) + c^{\hat{u}\hat{v}}(q)} \quad (1)$$

This can be known as a "top-click" rate, as it gives the proportion of occasions on which the result presented ahead of (e.g. above or before) the other is selected. The other top-click rate for the alternative presentation sequence (where v is on top) is given by:

$$\frac{c^{\hat{v}u}(q)}{c^{\hat{v}u}(q) + c^{v\hat{u}}(q) + c^{\hat{v}\hat{u}}(q)} \quad (2)$$

The combination of equations (1) and (2) therefore give the top-click rate in both presentation sequences. Note that other fractions, apart from the top-click rate, can also or alternatively be determined, as outlined in more detail below.

Once a fraction for each presentation sequence has been determined (e.g. equation (1) and (2) above), then one or more or a combination of these fractions is selected 208 as the measure of duplication/redundancy. In one example, the minimum of the two fractions is selected, such that the measure of duplication for the pair of results and the query is given by:

$$\min\left(\frac{c^{\hat{u}v}(q)}{c^{\hat{u}v}(q) + c^{u\hat{v}}(q) + c^{\hat{u}\hat{v}}(q)}, \frac{c^{\hat{v}u}(q)}{c^{\hat{v}u}(q) + c^{v\hat{u}}(q) + c^{\hat{v}\hat{u}}(q)}\right) \quad (3)$$

This measure of duplication/redundancy is known as the minimum top-click rate. Other measures of duplication can also be calculated, as outlined below. Once the measure of duplication has been calculated, it is output 210 from the duplication measurement engine 130. This value for the duplication or redundancy between the pair of results can be used by the search engine, optionally in combination with measurements from other duplication engines, for example as outlined with reference to FIG. 5, below.

With the minimum top-click rate measure of duplication shown in equation (3), a higher value indicates a higher degree of duplicated information or redundancy between the two search results. This is because a user is more likely to only select the higher result in the ranked list, and ignore the lower (duplicate) one.

As mentioned, additional measures of duplication or redundancy can also be derived from the behavioral data, by using different predetermined combinations of one or both of the results (i.e. u only, v only or both u and v) and different techniques for selecting between the fractions. For example, the maximum top-click rate can be determined by taking the maximum of the fractions in equations (1) and (2) as follows:

$$\max\left(\frac{c^{\hat{u}v}(q)}{c^{\hat{u}v}(q) + c^{u\hat{v}}(q) + c^{\hat{u}\hat{v}}(q)}, \frac{c^{\hat{v}u}(q)}{c^{\hat{v}u}(q) + c^{v\hat{u}}(q) + c^{\hat{v}\hat{u}}(q)}\right) \quad (4)$$

The bottom-click rate can be found by determining the proportion of occurrences at which the bottom-most result was selected in both presentation sequences. From this, a measurement of duplication called the minimum bottom-click rate can be calculated using:

$$\min\left(\frac{c^{\dot{u}\hat{v}}(q)}{c^{\dot{u}v}(q)+c^{\dot{u}\hat{v}}(q)+c^{\dot{u}\check{v}}(q)}, \frac{c^{v\hat{u}}(q)}{c^{\check{v}u}(q)+c^{\check{v}\hat{u}}(q)+c^{\check{v}\check{u}}(q)}\right) \quad (5)$$

Similarly, the maximum bottom-click rate can be found by:

$$\max\left(\frac{c^{\dot{u}\hat{v}}(q)}{c^{\dot{u}v}(q)+c^{\dot{u}\hat{v}}(q)+c^{\dot{u}\check{v}}(q)}, \frac{c^{v\hat{u}}(q)}{c^{\check{v}u}(q)+c^{\check{v}\hat{u}}(q)+c^{\check{v}\check{u}}(q)}\right) \quad (6)$$

The both-click rate can be found by determining the proportion of occurrences at which both of the results were selected in both presentation sequences. From this, a measurement of duplication called the minimum both-click rate can be calculated by:

$$\min\left(\frac{c^{\dot{u}\check{v}}(q)}{c^{\dot{u}v}(q)+c^{\dot{u}\hat{v}}(q)+c^{\dot{u}\check{v}}(q)}, \frac{c^{\check{v}\check{u}}(q)}{c^{\check{v}u}(q)+c^{\check{v}\hat{u}}(q)+c^{\check{v}\check{u}}(q)}\right) \quad (7)$$

The maximum bottom-click rate can be found by:

$$\max\left(\frac{c^{\dot{u}\check{v}}(q)}{c^{\dot{u}v}(q)+c^{\dot{u}\hat{v}}(q)+c^{\dot{u}\check{v}}(q)}, \frac{c^{\check{v}\check{u}}(q)}{c^{\check{v}u}(q)+c^{\check{v}\hat{u}}(q)+c^{\check{v}\check{u}}(q)}\right) \quad (8)$$

The mean both-click rate can be found by:

$$\frac{1}{2}\left(\frac{c^{\dot{u}\check{v}}(q)}{c^{\dot{u}v}(q)+c^{\dot{u}\hat{v}}(q)+c^{\dot{u}\check{v}}(q)}, \frac{c^{\check{v}\check{u}}(q)}{c^{\check{v}u}(q)+c^{\check{v}\hat{u}}(q)+c^{\check{v}\check{u}}(q)}\right) \quad (9)$$

The value for the duplication or redundancy between a pair of results, as calculated by one of the equations described above, can subsequently be used to enhance the search engine 104. For example, when a search engine 104 generates a ranked list of results, the above described techniques can be used to determine the duplication or redundancy between pairs of results in the ranked list. If certain pairs of results are determined to have a level of duplication or redundancy that is higher than a predetermined level, then one of the pair of results can be removed from the ranked list when it is displayed to the user in the user interface 114. This reduces the amount of redundant search results, and hence may increase user satisfaction. In further examples, pairs of results determined to be duplicates can be formatted differently in the user interface, e.g. by combining them into one larger result, making one of the results smaller than the other, indenting one relative to the other, or any other suitable way of visually indicating that the two results may be related. An overall value for the redundancy in a ranked list of results can also be calculated using these techniques, as described below with reference to FIG. 5.

In some examples, the different measures of duplication outlined above can be combined together to give a more accurate duplication/redundancy measure. For example, the different measures can be utilized in a classifier, which is trained to determine whether a pair of results are classified as duplicates or not. Such a classifier can, for example, be in the form of a machine learning classifier such as a decision tree, or a decision forest made up of a plurality of decision trees. Alternative machine learning classifiers that can be used include neural networks and support vector machines. In a further example, a classifier using manually optimized rules or heuristics can be used.

Figure 3:
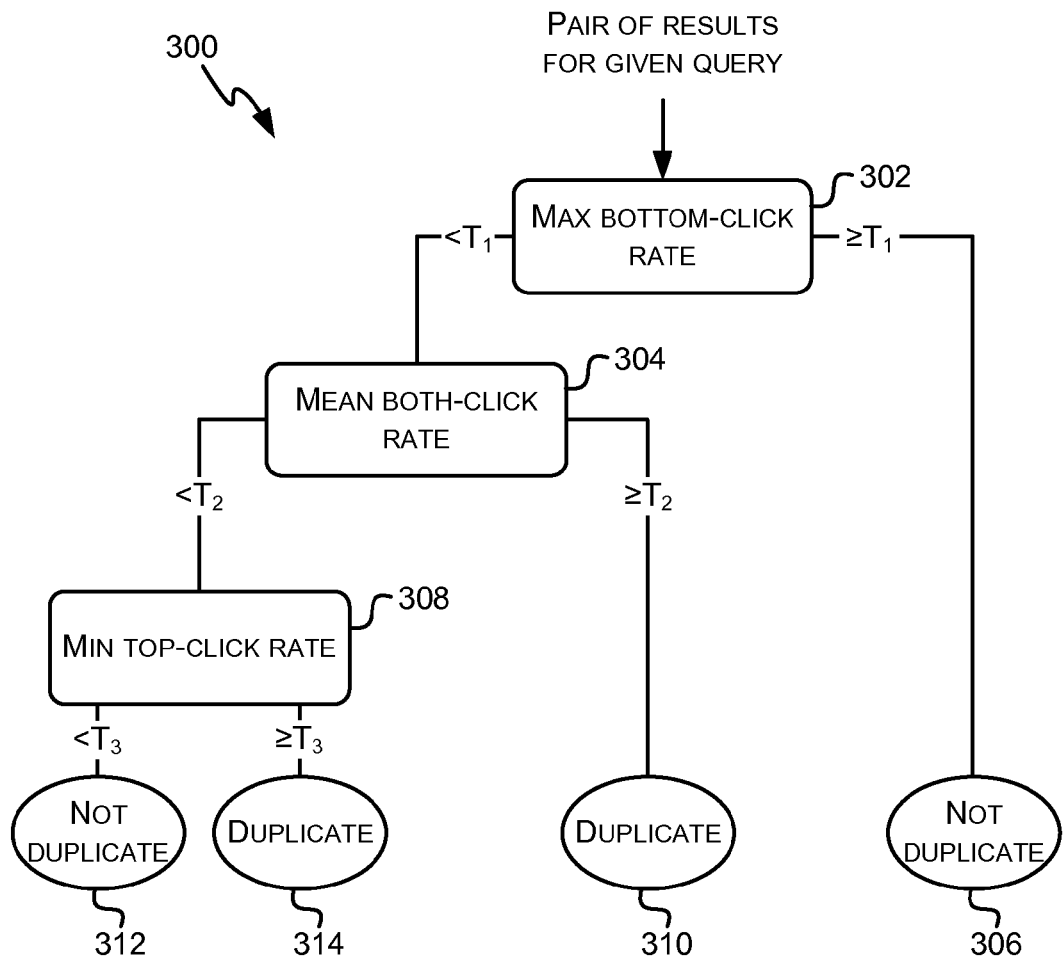
FIG. 3 illustrates an example decision tree for detecting duplication in a pair of search results.

An illustrative example of a decision tree classifier is shown in FIG. 3. In order to use a decision tree classifier, it is first trained on a training corpus of annotated data. In other words, a training corpus of pairs of results is assembled, and each pair is assessed by hand to determine if they are duplicates or not for a given query. Therefore, the training corpus forms a ground-truth database. This training corpus can then be used to generate a decision tree that can be used to classify unseen pairs as duplicates or not. In one example, the decision tree can be generated using a known algorithm such as the ID3 (also knows as Iterative Dichotomiser 3) algorithm.

For example, a decision tree classifier can be generated by selecting a root node of the tree, and selecting all the pairs of results from the training corpus (which are pre-labeled as duplicates or not). A random set of test parameters are generated for the root node, which can be in the form of a selected measure of duplication and a threshold duplication value. The test parameters can be applied to a pair of results to give a true/false result. An example of a randomly selected test parameter can be: "is the min bottom-click rate >0.4?" The true or false result from a test parameter determines whether a pair of results passes to a first child node or a second child node below the root. Every combination from the set of test parameters is then applied to each of the pair of results. For each combination, the information gain (also known as the relative entropy) is calculated. The combination of parameters that maximize the information gain is selected and stored at the root node for future use.

The process then moves to training the child nodes of the root node. Each child node is trained using the subset of the pairs of results from the root node. The subset of the pairs of results sent to a child node is determined using the parameters that maximized the information gain. The pairs of results that pass the test (true result) form a first subset sent to a first child node, and the pairs of results that fail the test (false result) form a second subset sent to a second child node. For each of the child nodes, new random test parameters are generated, applied to the respective subset of pairs of results, and parameters maximizing the information gain selected. This is repeated for each subsequent generation of child nodes until either the value for the maximized information gain is less than a threshold for a branch, or the depth of the tree (i.e. how many levels of nodes are between the root node and the current node) is greater than a predetermined value. When this situation is reached, the current node is set as a leaf node. Therefore, this process moves through the tree, training each node until leaf nodes are reached at each branch.

Once all the nodes in the tree have been trained to determine the parameters for the test maximizing the information gain at each node, and leaf nodes have been selected to terminate each branch, then probability distributions can be determined for all the leaf nodes of the tree. This is achieved by counting the labels (duplicate or not duplicate) of the pairs of results that reach each of the leaf nodes. From the number of pairs of results with each label at a leaf node and the total number of pairs of results at that leaf node, a probability distribution for the classes at that leaf node can be generated. Optionally, multiple trees can be trained in this way, which gives a decision forest of distinct trained decision trees.

FIG. 3 shows an illustrative example of how a trained decision tree 300 can be used to classify a pair of results. Firstly, a pair of results from a given query are input to a root node 302 of the trained decision tree 300. The training process has determined that the test maximizing the information gain at the root node 302 was the maximum bottom-click rate test, with a threshold of $T_1$. The maximum bottom-click rate is calculated, as described above, for the pair of results. If the value calculated is less than $T_1$ then the pair passes to child node 304. If the value calculated is greater than or equal to $T_1$ then the pair passes to leaf node 306, which indicates that the pair of results are not likely to be duplicates of each other for this query.

If the pair passes to child node 304, then the test associated with this child node 304 is performed. The training process has determined that the test at this node is the mean both-click rate with a threshold of $T_2$. This is calculated as described above, and if the calculated value is less than $T_2$, then the pair passes to child node 308, whereas if the calculated value is greater than or equal to $T_2$, then the pair passes to leaf node 310, which indicates that the pair of results are likely to be duplicates of each other for this query.

If the pair passes to child node 308, then the test associated with this child node 308 is performed. The training process has determined that the test at this node is the minimum top-click rate with a threshold of $T_3$. This is calculated as described above, and if the calculated value is less than $T_3$, then the pair passes to leaf node 312, which indicates that the pair of results are not likely to be duplicates of each other for this query. Conversely, if the calculated value is greater than or equal to $T_3$, then the pair passes to leaf node 314, which indicates that the pair of results are likely to be duplicates of each other for this query.

Therefore, by passing the pair of results through the trained decision tree 300, a leaf node is eventually reached which classifies the pair of results as either as duplicate or not. This uses a combination of duplication measures that are readily calculated from the click history as described above. If a plurality of decision trees are used in a decision forest, then the pair of results can be passed through all of the tress, and the results from each aggregated. Note that the structure of the decision tree 300 shown in FIG. 3, and the measures of duplication used at each node, are merely illustrative.

The various measures of duplication/redundancy outlined above can also be used with a machine learning classifier to identify different types of redundancy between results. For example, three different classifications of redundancy that can be identified are: exact duplicates; content duplicates; and navigational duplicates, as outlined below.

Exact duplicates are where both documents appear identical. In some examples, this can be with the exception of advertisements (e.g. on a webpage).

Content duplicates occur where both pages provide effectively the same information with respect to the query, but from different sources. Examples of content duplicates include two different web sites with lyrics for the same song, or two different sites for converting centimeters into inches. While these alternatives may differ in relevance (for example, due to the clarity of presentation), most users would find either redundant if they have already observed the other.

Navigational duplicates occur where one of the pages is more relevant, but navigating from one page to the other is very easy. In such situations, it can be easier for a user to get to the more relevant result from the less relevant result by browsing than by returning to the search results. This is often the case when a user clicks on one search result without having considered the next result. If the user expects that the cost of backing out from a result that is almost correct to find the right result in a search engine ranking is higher than the expected cost of navigating, then the user is likely to choose to navigate instead. Examples of navigational duplicates are the homepage and the sports page of a newspaper, or the online banking login page of a bank and the "contact us" page of the same bank. Occurrences can also be observed where pairs of results where neither was quite what the user was looking for, but navigating to the correct page from either was equally trivial.

A decision tree classifier, similar to that described above, can be used to classify a pair of results as belonging to one of these classes of duplicate (or as not a duplicate). A decision tree is trained in a similar way to that described above, except that the training corpus comprises pairs of results that are pre-labeled as being either an exact duplicate, a content duplicate, a navigational duplicate, or not duplicates. The leaf nodes of the trained decision tree then indicate probability distributions of the pair belonging to one of these classifications.

Figure 4:
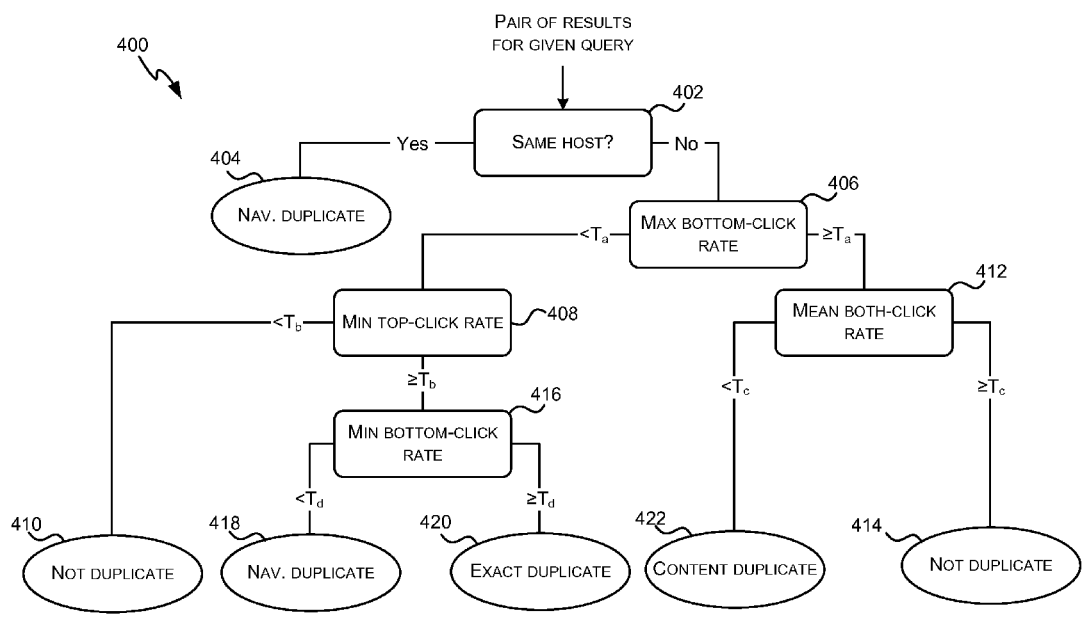
FIG. 4 illustrates an example decision tree for classifying duplication in a pair of search results.

FIG. 4 shows an illustrative example of a trained decision tree 400 for classifying the type of duplication or redundancy between a pair of results. A pair of results for a given query is input to a root node 402 of the decision tree 400. In this example, the training process has selected a different type of test for the root node 402. Here, the root node 402 determines whether the pair of results are from the same location. For example, in the case of a web search, it is determined whether the URL of the webpage or document is on the same hostname. If so, this indicates that the pair of results are likely to be navigational duplicates 404. If not, then a combination of measures derived from click features are used, similar to that described above.

In the example of FIG. 4, if the pair of results are on different hosts, have a maximum bottom-click rate 406 less than a threshold $T_a$ and a minimum top-click rate 408 less than a threshold $T_b$, then the pair of results are classified as not duplicates 410. Similarly, if the pair of results are on different hosts, have a maximum bottom-click rate 406 greater than or equal to threshold $T_a$ and a mean both-click rate 412 greater than or equal to a threshold $T_c$, then the pair of results are classified as not duplicates 414.

If the pair of results are on different hosts, have a maximum bottom-click rate 406 less than threshold $T_a$, a minimum top-click rate 408 greater than or equal to threshold $T_b$, and a minimum bottom-click rate 416 less than a threshold $T_d$, then the pair of results are classified as navigational duplicates 418. If the pair of results are on different hosts, have a maximum bottom-click rate 406 less than threshold $T_a$, a minimum top-click rate 408 greater than or equal to threshold $T_b$, and a minimum bottom-click rate 416 greater than or equal to a threshold $T_d$, then the pair of results are classified as exact duplicates 420. Finally, if the pair of results are on different hosts, have a maximum bottom-click rate 406 greater than or equal to threshold $T_a$, and a mean both-click rate 412 less than threshold $T_c$, then the pair of results are classified as content duplicates 422.

Therefore, a decision tree classifier of the type described with reference to FIG. 4 can be used to estimate the type of duplication/redundancy that is present between a pair of documents. A plurality of decision trees of the type in FIG. 4 can also be used to form a decision forest. Note that the structure of the decision tree 400 shown in FIG. 4, and the measures of duplication used at each node, are merely illustrative.

The determination of the classification of duplication between a pair of results can be used to adapt the results presented by the information retrieval system 100. The information retrieval system can treat the different classes of duplicates in different ways. For example, it is not beneficial for the information retrieval system to display exact duplicates, and these can therefore be removed from search results presented in the user interface 114. However, for queries where users expect a range of options, content duplicates can be shown in the user interface, although in some examples the user interface can be adapted to emphasize that such results are alternatives for the user to obtain similar information. In the case of navigational duplicates, the information retrieval system can, for example, combine the results in the user interface, providing users with these and other alternative destinations on the same website.

Figure 5:
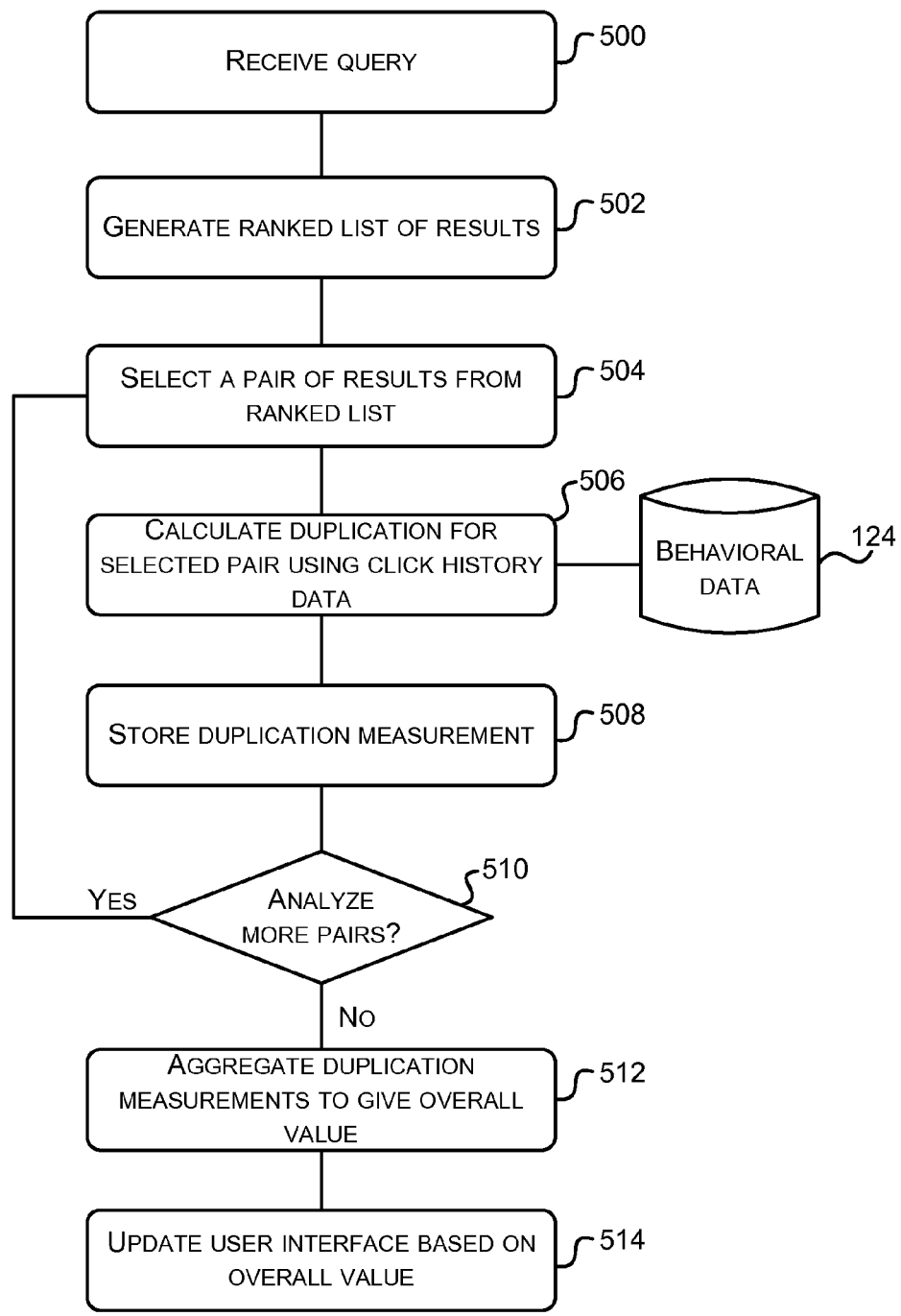
FIG. 5 illustrates a flowchart of a process for calculating an aggregate redundancy for a search results list.

Reference is now made to FIG. 5, which illustrates a flowchart of a process for calculating an aggregate redundancy for a search results list, using any of the duplication measurement techniques described above. The process of FIG. 5 can, in one example, be implemented by the search engine 104 or another element of the information retrieval system 100.

A query is received 500, and the search engine 104 generates 502 a ranked list of search result in response to the query, as described above with reference to FIG. 1. In order to determine an overall value for the redundancy in this ranked list of results, a first pair of results are selected 504 from the ranked list. In one example, these results are adjacent in the ranked list. The pair of results can, for example, be selected at random from the ranked list. A duplication measurement for the selected pair of results is then calculated 506, using the behavioral data store 124 and any of the techniques described previously. For example, the minimum top-click rate can be calculated for the selected pair of results. The calculated duplication measurement is then stored 508.

It is then determined 510 whether more pairs of results are to be analyzed. In one example, a predetermined number of pairs of results are analyzed, each selected at random from the ranked list. If more pairs of results are to be analyzed, then the process of selecting a pair and calculating the duplication or redundancy is repeated.

Once it has been determined 510 that no more pairs of results are to be analyzed, each of the stored measurements of duplication for the pairs of results are aggregated 512 to give an overall value. In one example, the overall value can be determined by calculating the entropy of the distribution of the duplication measurements. In other examples, a different aggregation technique can be used, such as calculating the mean or variance of the distribution of the duplication measurements.

The overall value for the redundancy of the search results in the ranked list can then be utilized by the information retrieval system 100. In the example of FIG. 5, the user interface is updated 514 in dependence on the overall value of the redundancy. For example, the look or format of the user interface can be changed when a significant amount of redundancy is present in the search results, for example to highlight a smaller number of results. In another example, the overall value for the redundancy for this query can be fed back to the search engine 104. The search engine 104 can use this information to alter or optimize the search algorithms used for this query, such that future searches for this query provide fewer redundant results.

In a further example, the measurements of duplication outlined above can be used to improve the processes by which the search engine is trained to generate search results. The search engine uses training data in order to optimize the search algorithms. The training data used by the search engine is human-generated data, and is therefore slow to produce and verify.

In one example, the measures of duplication can be used to automatically label the training data as being redundant or belonging to a category of duplication or redundancy, as outlined above. This automates one stage of the training process, thereby reducing the time to hand-annotate the training data. In another example, the measures of duplication can be used to verify hand-annotated data. For example, when an item of training data has been manually labeled as being a duplicate (or conversely not a duplicate), and the measure of duplication does not agree with this, then this can indicate a discrepancy which can be checked further. This assists in reducing noise present in human labeling of data.

Similar to training search engines, evaluation of the quality of search engines require human judgments that are expensive to obtain. The above-described techniques can also be used to automatically generate labeled data that can be used to evaluate the quality of search engines based on the extent of redundancy in the search results.

A further application of the above-described technique is to infer improved relevance values given clicks. Previous work on relevance values assumes that clicks are a direct function of relevance, ignoring the fact that clicks are highly affected by duplication: if a highly relevant document d1 is always presented below its duplicate d2, it is unlikely that d1 will be clicked. Previous work infers from this that d1 is not relevant with respect to the given query. However, the above-described techniques can be used to extend this by inferring relevance labels from clicks to incorporate the effect of duplication, resulting in more accurate inferences.

Figure 6:
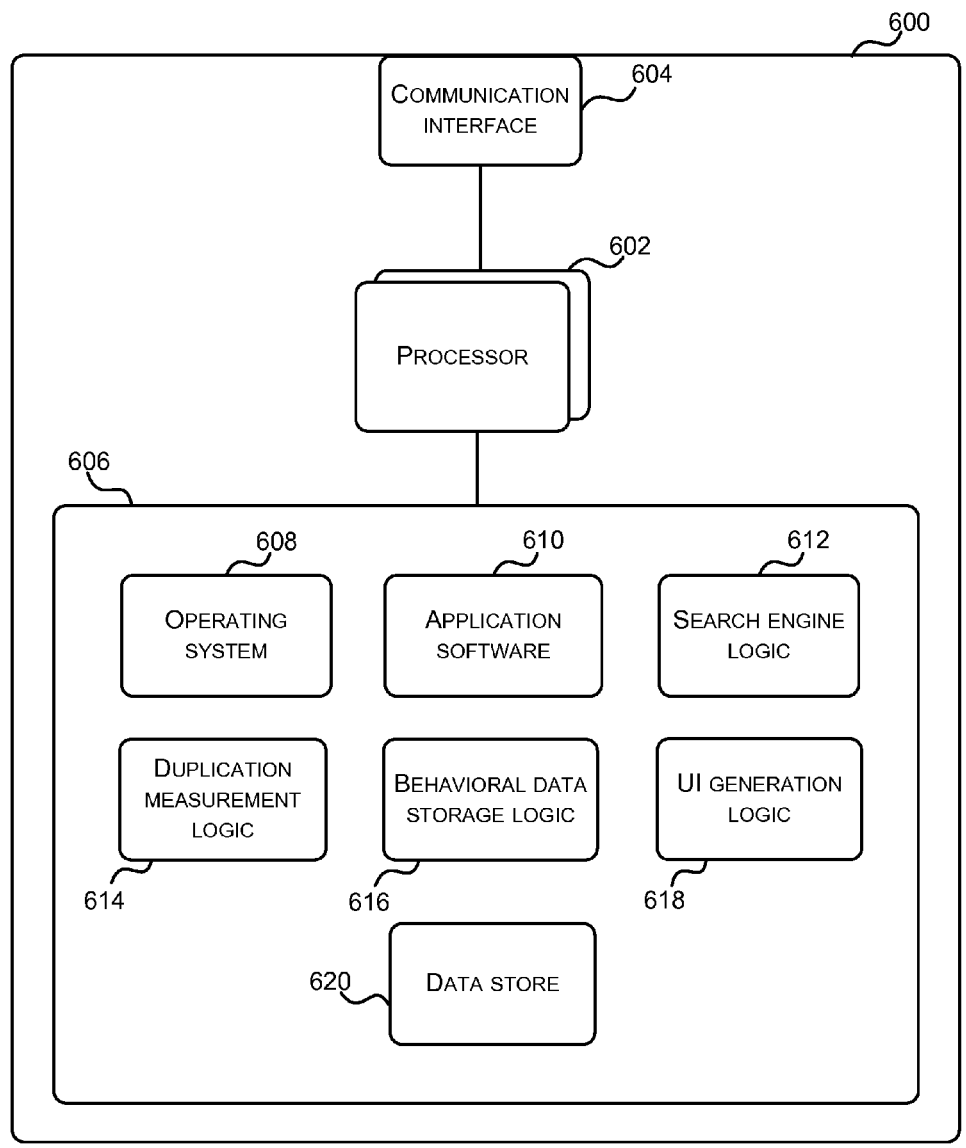
FIG. 6 illustrates an exemplary computing-based device in which embodiments of the duplication measurement technique may be implemented.

Reference is now made to FIG. 6, which illustrates various components of a computing device 600. Computing device 600 may be implemented as any form of a computing and/or electronic device in which the processing for the information retrieval system 100 may be implemented.

Computing device 600 comprises one or more processors 602 which may be microprocessors, controllers or any other suitable type of processor for processing computer executable instructions to control the operation of the device in order to implement the search engine and duplication measurement techniques.

The computing device 600 also comprises a communication interface 604, which can be arranged to communicate with one or more communication networks. For example, the communication interface 604 can connect the computing device 600 to the network 102. The communication interface 604 can enable the computing device 600 to communicate with other network elements, such as computing device 112 to receive queries and transmit back the user interface and search results.

Computer-executable instructions and data storage can be provided using any computer-readable media that is accessible by computing device 600. Computer-readable media may include, for example, computer storage media such as memory 606 and communications media. Computer storage media, such as memory 606, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (such as memory 606) is shown within the computing device 600 it will be appreciated that the storage may be distributed or located remotely and accessed via a network or other communication link (e.g. using communication interface 604).

Platform software comprising an operating system 608 or any other suitable platform software may be provided at the memory 606 of the computing device 600 to enable application software 610 to be executed on the device. The memory 606 can store executable instructions to implement one or more of the following when executed on the processor 602:

- search engine logic 612, arranged to generate a ranked list of results in response to a query;
- duplication measurement logic 614, arranged to calculate duplication between a pair of results as described above;
- behavioral data storage logic 616, arranged to maintain the click history data 124 as users select search engine results; and
- UI generation logic 618, arranged to generate the user interface 114 provided to the user.

The memory 606 can also provide a data store 620, which can be used to provide storage for data used by the processor 602 when performing the duplication measurement techniques, such as the storing the behavioral data store 124, and the trained decision trees.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of measuring duplication between a pair of results provided by an information retrieval system in response to a query, the method comprising:
   - accessing history data for the information retrieval system stored on a memory and retrieving query data describing the number of times that users of the information retrieval system have previously selected either or both of the pair of results, and a relative presentation sequence of the pair of results when displayed by the information retrieval system at each selection;
   - determining from the query data, at a processor, a fraction of user selections in which a predefined combination of one or both of the pair of results were selected for a predefined presentation sequence;
   - determining from the fraction, at the processor, a measure of the duplication between the pair of results; and
   - causing a display of results for the query to indicate the pair of results are duplicates when the measure of the duplication meets a condition, wherein the query data comprises:
   - a count of the number of times that both of the pair of results were selected when the first one of the pair of results was presented ahead of a second one of the pair of results; and
   - a count of the number of times that both of the pair of results were selected when the second one of the pair of results was presented ahead of the first one of the pair of results.

2. A method according to claim 1, wherein the step of determining a fraction of user selections comprises: determining a fraction of total user selections for the pair of results in which a first one of the pair of results was selected when presented ahead of a second one of the pair of results.

3. A method according to claim 2, further comprising determining, from the query data, a further fraction of total user selections for the pair of results in which the second one of the pair of results was selected when presented ahead of the first one of the pair of results.

4. A method according to claim 3, wherein the step of determining a measure of the duplication between the pair of results comprises: selecting the minimum of the fraction and the further fraction as the measure of the duplication between the pair of results.

5. A method according to claim 3, wherein the step of determining a measure of the duplication between the pair of results comprises: selecting the maximum of the fraction and the further fraction as the measure of the duplication between the pair of results.

6. A method according to claim 1, wherein the step of determining a fraction of user selections comprises: determining a fraction of total user selections for the pair of results in which a first one of the pair of results was selected when presented below a second one of the pair of results; and
the method further comprises: determining, from the query data, a further fraction of total user selections for the pair of results in which the second one of the pair of results was selected when presented below the first one of the pair of results.

7. A method according to claim 6, wherein the step of determining a measure of the duplication between the pair of results comprises:
selecting the minimum of the fraction and the further fraction as the measure of the duplication between the pair of results; or
selecting the maximum of the fraction and the further fraction as the measure of the duplication between the pair of results.

8. A method according to claim 1, wherein the step of determining a fraction of user selections comprises: determining a fraction of total user selections for the pair of results in which both of the pair of results were selected when a first one of the pair of results was presented ahead of a second one of the pair of results; and
the method further comprises: determining, from the query data, a further fraction of total user selections for the pair of results in which both of the pair of results were selected when the second one of the pair of results was presented ahead of the first one of the pair of results.

9. A method according to claim 8, wherein the step of determining a measure of the duplication between the pair of results comprises:
selecting the minimum of the fraction and the further fraction as the measure of the duplication between the pair of results;
selecting the maximum of the fraction and the further fraction as the measure of the duplication between the pair of results; or
selecting the mean of the fraction and the further fraction as the measure of the duplication between the pair of results.

10. A method according to claim 1, wherein the query data further comprises:
the count of the number of times that the first one of the pair of results was selected when the first one of the pair of results was presented ahead of the second one of the pair of results;
the count of the number of times that the second one of the pair of results was selected when the first one of the pair of results was presented ahead of the second one of the pair of results;
the count of the number of times that the first one of the pair of results was selected when the second one of the pair of results was presented ahead of the first one of the pair of results; and
the count of the number of times that the second one of the pair of results was selected when the second one of the pair of results was presented ahead of the first one of the pair of results.

11. A method according to claim 1, further comprising the step of: receiving the predefined combination and the predefined presentation sequence from a classifier arranged to determine whether the pair of results are duplicates by determining a plurality of measurements of duplication using a plurality of predefined combinations and predefined presentation sequences.

12. A method according to claim 1, further comprising the steps of:
accessing at least one trained decision tree stored on a memory, the decision tree comprising a plurality of nodes, wherein each node comprises an associated predefined combination of one or both of the pair of results and predefined presentation sequence;
selecting a node of the decision tree;
reading the predefined combination and the predefined presentation sequence associated with the selected node, prior to determining the fraction; and
subsequent to determining the measure of the duplication between the pair of results, selecting a further node based on the measure.

13. A method according to claim 12, further comprising the steps of:
repeating the steps of reading the predefined combination and the predefined presentation sequence, determining the fraction, and determining the measure of the duplication between the pair of results, until the pair of results have passed to a leaf node of the decision tree; and
determining from the leaf node reached whether the pair of results are duplicates.

14. An information retrieval system comprising
a communication interface arranged to receive a query;
a processor arranged to generate a ranked list of results in response to the query and select a pair of results from the ranked list;
a user interface arranged to display the ranked list; and
a memory arranged to store history data for the information retrieval system, the history data comprising query data describing the number of times that users of the information retrieval system have previously selected either or both of the pair of results, and a relative presentation sequence of the pair of results when displayed in the user interface at each selection,
wherein the processor is further arranged to retrieve the query data, determine from the query data a fraction of user selections in which a predefined combination of one or both of the pair of results were selected for a predefined presentation sequence, determine from the fraction a measure of the duplication between the pair of results, and cause a display of results for the query to indicate the pair of results are duplicates when the measure of the duplication meets a condition, wherein the query data comprises:
a count of the number of times that both of the pair of results were selected when the first one of the pair of results was presented ahead of a second one of the pair of results; and
a count of the number of times that both of the pair of results were selected when the second one of the pair of results was presented ahead of the first one of the pair of results.

15. An information retrieval system according to claim 14, wherein the pair of results are adjacent in the ranked list and history data includes a previous selection of one of the pair of results only when no other result was selected within a first time period after the previous selection and no other query was made within a second time period after the previous selection.

16. An information retrieval system according to claim 14, wherein the processor is further arranged to remove one of the pair of results from the ranked list if the measure of the duplication is greater than a predefined threshold.

17. An information retrieval system according to claim 16, wherein the processor is further arranged to update the user interface if the measure of the duplication is greater than a predefined threshold.

18. An information retrieval system according to claim 14, wherein the processor is further arranged to select a plurality of further pairs of results and determine the measure of the duplication for each of these further pairs of results, and calculate an overall value of redundancy for the ranked list from a distribution of the duplication measured.

19. An information retrieval system according to claim 18, wherein the processor is arranged to calculate the overall value of redundancy using at least one of the mean, entropy, and variance of the distribution.

20. One or more computer tangible storage media with device-executable instructions that, when executed by a computing system, direct the computing system to perform steps comprising:

receiving a pair of results generated by a search engine in response to a user query, each result in the pair of results comprising a link to a document;
accessing stored history data for the search engine and retrieving query data associated with the user query and describing the number of times that users of the search engine have previously clicked either or both of the pair of results when the pair of results were previously presented to the users as results for the user query, and a relative presentation sequence of the pair of results when displayed by search engine at each click;
determining, from the query data, a first fraction of total user clicks for the pair of results in which a first one of the pair of results was clicked when presented above a second one of the pair of results;
determining, from the query data, a second fraction of total user clicks for the pair of results in which the second one of the pair of results was clicked when presented above the first one of the pair of results;
selecting the minimum of the first fraction and second fraction as a measure of the duplication with respect to the user query between the documents linked by the pair of results; and
causing a display of results for the user query to indicate the pair of results are duplicates when the measure of the duplication meets a condition,
wherein the query data comprises:
a count of the number of times that both of the pair of results were selected when the first one of the pair of results was presented ahead of a second one of the pair of results; and
a count of the number of times that both of the pair of results were selected when the second one of the pair of results was presented ahead of the first one of the pair of results.

* * * * *